UNITED STATES PATENT OFFICE.

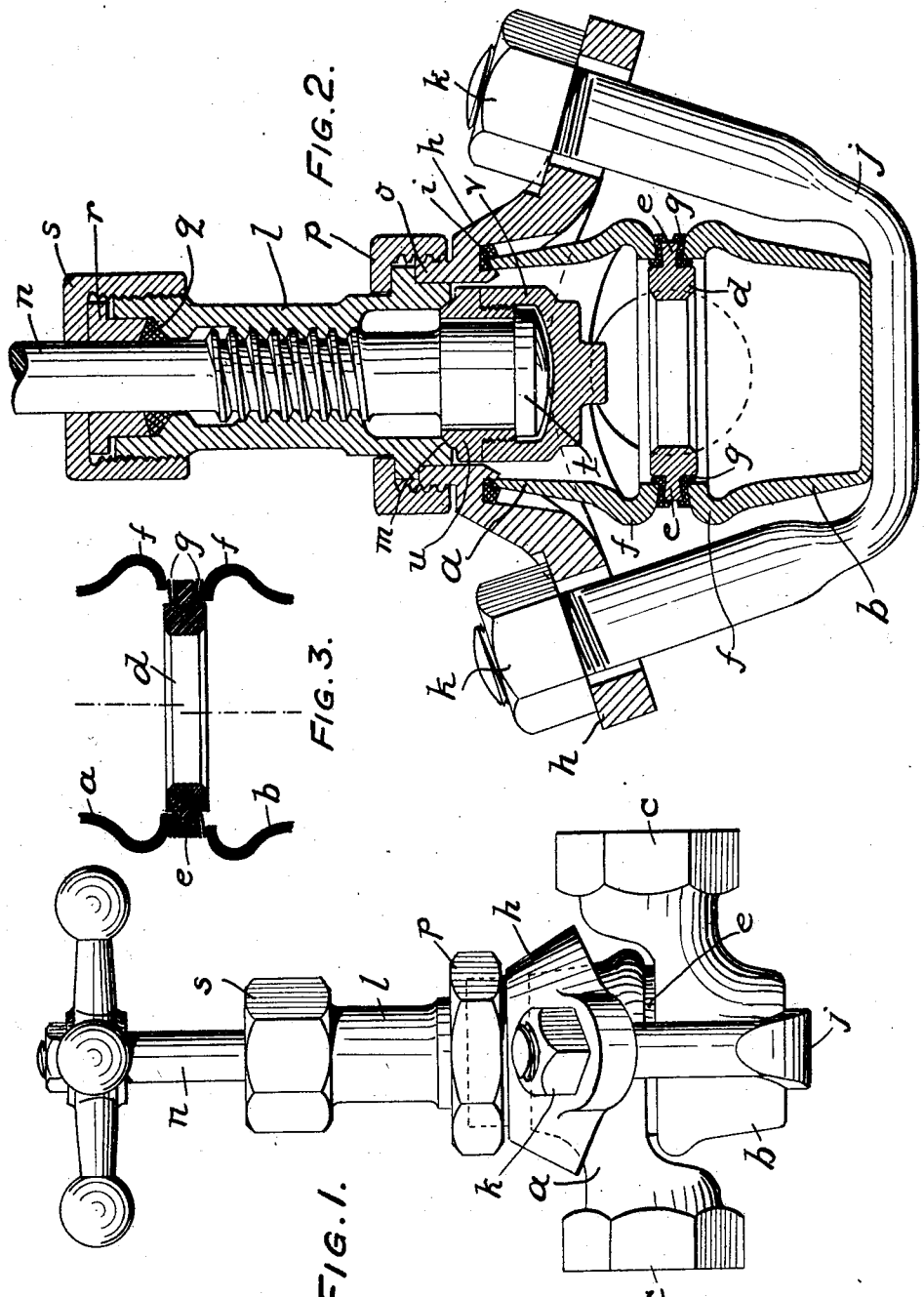

KARL A. SODERSTROM, OF PHILADELPHIA, PENNSYLVANIA.

VALVE.

1,395,018.   Specification of Letters Patent.   Patented Oct. 25, 1921.

Application filed May 11, 1920. Serial No. 380,512.

*To all whom it may concern:*

Be it known that I, KARL A. SODERSTROM, a citizen of the United States, residing at Philadelphia, county of Philadelphia, and State of Pennsylvania, have invented a new and useful Improvement in Valves, of which the following is a full, clear, and exact description, reference being had to the accompanying drawings, which form a part of this specification.

The object of my invention is to provide a novel form of valve which will be adaptable to all the uses of present known types and at the same time will be more efficient in operation, more readily installed, and cheaper of manufacture.

The present types of valves, and I refer more particularly to globe valves, present a variety of difficulties in their installation. For example, they must be installed in a straight extension of pipe and one of the lengths of pipe connected to the valve must be connected to the line by a union. It is necessary that the pipe line, in which the valve is installed, be cut with considerable accuracy, and it is well known that the union connection must be accurate in order to prevent leakage. Thus, the installation of the present type of valves involves the careful fitting of the pipe, and if installed in an old line requires in addition the removal of a considerable length of pipe in order that it may be properly fitted and to allow for the union connection, which is costly in time and material.

In accordance with my invention, I provide a valve which is so constructed as to enable it to be installed in a pipe line without the use of a union, and of a construction which will permit of its being adjusted in length and of its installation between the ends of pipes extending at an angle to each other as well as in a line. Thus my valve may be installed without any great care being taken in fitting and without the use of unions, and if installed in an old line requires only sufficient pipe to be cut out to accommodate it.

I will now proceed to describe, in detail, a preferred embodiment of my invention with reference to the accompanying drawings, in which—

Figure 1 is a side view of a complete valve.

Fig. 2 is a cross-sectional view of the valve shown in Fig. 1.

Fig. 3 is a diagrammatic view illustrating the lengthwise adjustability of the valve shown in Fig. 1.

The body of the valve, which may be drawn, cast, or otherwise fabricated, is formed by an upper chamber $a$, open at the top and bottom, and a lower chamber $b$, closed at the bottom, each of the chambers being provided with extensions $c$, having internally threaded hexagon shaped ends for connection to the ends of pipe, between which the valve is installed. A valve seat $d$ having a peripheral flange $e$, is adapted to be positioned between the upper and lower chambers forming the body, the adjacent edges of which are inturned, as at $f$, and bear upon packing rings $g$ placed about the seat, above and below the flange. A clearance is left between the edges of the body section and the body of the seat to permit of opposite lateral movement of the upper and lower sections of the valve body on the flange, without disturbing the position of the seat relative to the valve, as shown in Fig. 3, thus permitting the valve to be longitudinally adjusted.

The chambers $a$ and $b$ are secured together, and the valve seat secured in position between them, by means of a clamp comprising a collar $h$, recessed to engage the upper edge of the upper chamber, which is suitably packed therein, as at $i$, and a strap $j$ engaging the bottom of the lower casing $b$, passing through suitable holes in the collar and threaded for the reception of clamping nuts $k$, which when tightened up clamp the two chambers of the body together and secure the seat in place. The packing ring being squeezed between the edges of the body sections is distorted and expands into the space between the edges of the body sections and the seat, as shown in Fig. 2, insuring a tight joint between the sections.

A valve stem guide $l$, provided with a seat $m$ on its lower end and internally threaded to receive the valve steam $n$, is supported by a flange $o$ on collar $h$ and is secured thereto by means of a nut $p$, suitably threaded on the flange $o$. The stem is packed in the guide by means of any suitable packing material $q$, a gland $r$ and a packing nut $s$ threaded on the guide.

The valve stem $n$, suitably threaded to engage in the guide, is flanged at its lower end as at $t$. A collar $u$, loosely encircling the lower end of the stem and resting on the flange $t$, is provided on its upper end with a sealing surface adapted to rest on the seat $m$, when the stem is in fully raised position, in order to insure against leakage. The valve proper $v$ is threaded on the lower end of collar $u$ and is adapted, when the stem is in its lowest position, to rest on the seat $d$, thus shutting off communication between the chambers $a$ and $b$.

If now it is desired to install the valve on new work, the clamp is taken off, the chambers $a$ and $b$ separated, and the hexagon ends of the extensions $c$ of each chamber screwed onto a pipe end. The two chambers are brought together with the seat inserted, and the clamp positioned and slightly tightened but not sufficiently to compress the packing rings $g$. The valve is then lowered to center the valve seat and after which the clamp is tightened to form tight joints between the parts and secure the seat central with relation to the valve. It will be noted that if the pipe ends, to which the chambers are attached, respectively, are out of line or if their extensions make an angle with each other, the valve may be as readily installed, since the chambers may be secured together irrespective of the angle of their extensions $c$ to each other. If the distance between the ends of the pipes between which the valve is to be installed, is found to have been inaccurately gaged, the valve will adjust itself lengthwise since the chambers may move laterally in opposite directions, as heretofore described and shown in Fig. 3. The valve stem moves with the upper chamber, but the valve $v$ is permitted to seat on the seat $d$, after adjustment of the chambers, due to the fact that the looseness of the collar $u$, to which the valve is secured, permits the valve to move off center relative to the stem and center itself with the seat.

If the valve is to be installed on old work, it is only necessary to cut out a section of pipe sufficient to admit the valve. The pipe sections are sprung out of alinement, the chambers applied to the ends of the pipe sections, and the chambers brought together, as described. The section cut out need not be cut with great accuracy, in view of the lengthwise adjustability of the valve, and it is immaterial whether the ends of pipes are in line or extending at an angle to each other.

It will be noted further that the use of my valve does away with the use of a union in its installation, thus combining the feature of the union with those of the valve and simplifying the installation.

The valve can also be inserted in a pipe line at a bend to take the place of an L or fitting of less or greater angle than a right angle.

As the valve stem extends in a plane normal to a plane passing through the axes of the pipe ends or the pipe end openings, and as the abutting faces of the chamber members $a$ and $b$ and the seat member $d$ are in planes parallel to the axes of the pipe openings and planes normal to the axis of the valve stem, the valve can be connected to two pipes in the same plane at varying angles, so long as there is room for the extensions $c$. As the abutting faces of the seat member $d$ and chamber members $a$ and $b$ are annular, the members can be shifted to different angles with relation to each other. As the clamping device merely secures the members to each other, it will function properly regardless of the angle of the extensions $c$, as the clamp may be positioned between the extensions as shown or both extensions might be placed at one side of the clamp.

The valve seat $d$ is the same on both sides so that if the valve seat becomes worn on one side it can readily be reversed, or removed and faced in a lathe.

Having now fully described my invention, what I claim and desire to protect by Letters Patent is:

1. A valve comprising, in combination, a body formed in two sections, each of said sections being adapted for connection with an end of pipe, a valve proper carried by one of the sections, a valve seat positioned between the sections, said sections being movable laterally relative to each other, and means adapted to secure the sections together.

2. A valve comprising, in combination, a body formed in two sections, each of said sections being adapted for connection with an end of pipe, a valve proper carried by one of the sections, a valve seat positioned between the sections, said sections being movable laterally relative to each other and to the seat, and means adapted to secure the sections together.

3. A valve comprising, in combination, a body formed in two sections, each of said sections being adapted for connection to an end of pipe, a valve proper carried by one of said sections, a valve seat positioned between said sections, said sections being rotatable and movable laterally relative to each other, and means adapted to secure said sections together.

4. A valve comprising, in combination, a body formed in two sections, each of said sections being adapted for connection with an end of pipe, a valve proper carried by one of said sections, a valve seat between said sections, said sections being movable laterally relative to each other, and means adapted to secure the sections together.

5. A valve comprising a body formed in two sections, each of said sections being adapted for connection to the free end of a pipe, a valve seat having a peripheral flange positioned between said sections, the opposite edges of said sections being inturned and engaging said flange, a valve proper carried by one of said sections, said sections being movable laterally relative to each other, and means adapted to secure said sections together.

6. A valve having a body formed of two separable sections, each section having a pipe end receiving extension, a valve seat member having a passage therethrough and a seating surface for each body section, the valve seat member lying in a plane parallel to the axes of the pipe end receiving extensions, a valve movably mounted in one of the body sections and arranged to engage the seat to close the passage therethrough, said valve being arranged to move in a plane at right angles to a plane passing through the centers of said extensions, and clamping means for clamping the body sections against the seating surfaces on the valve seat.

7. A valve having a body formed of two separable sections, each section having a pipe end receiving extension, each section also having a flow passage the axis of which is in a plane at right angles to the axis of the pipe end opening in the extension, a seat on each section surrounding the flow passage, a valve seat member between the seats of the sections having a port communicating with the flow passage in each section, a valve having a stem rotatable and reciprocatory in one section arranged to engage the seat member to close the port, and clamping means for clamping the body sections and valve seat member to each other, said body sections being arranged to be adjusted relative to each other to vary the angle between the extensions.

8. A valve having a body formed of two separable sections, each section having a pipe end receiving extension, each section also having a flow passage the axis of which is in a plane at right angles to the axis of the pipe end opening in the extension, a seat on each section surrounding the flow passage, a valve seat member between the seats of the sections having a port communicating with the flow passage in each section, a valve having a stem rotatable and reciprocatory in one section arranged to engage the seat member to close the port, said stem extending in a plane at right angles to a plane passing through the centers of the extensions, and clamping means for clamping the body sections and valve seat member to each other, said body sections being arranged to be adjusted relative to each other to vary the angle between the extensions without varying the angle between said centers and the valve stem.

In testimony of which invention, I have hereunto set my hand, at Philadelphia, Pa., on this 7th day of May, 1920.

KARL A. SODERSTROM.